(12) United States Patent
Jeon et al.

(10) Patent No.: US 10,942,566 B2
(45) Date of Patent: Mar. 9, 2021

(54) NAVIGATION SERVICE ASSISTANCE SYSTEM BASED ON DRIVER LINE OF SIGHT AND VEHICLE NAVIGATION SYSTEM USING THE SAME

(71) Applicant: LG ELECTRONICS INC., Seoul (KR)

(72) Inventors: Soojung Jeon, Seoul (KR); Junyoung Yu, Seoul (KR); Dae Geun Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/566,146

(22) Filed: Sep. 10, 2019

(65) Prior Publication Data

US 2020/0004332 A1 Jan. 2, 2020

(30) Foreign Application Priority Data

Sep. 5, 2019 (KR) .......................... 10-2019-0110281

(51) Int. Cl.
*G06F 3/01* (2006.01)
*G01C 21/36* (2006.01)
*G06K 9/32* (2006.01)
*G06K 9/00* (2006.01)

(52) U.S. Cl.
CPC ......... *G06F 3/013* (2013.01); *G01C 21/3608* (2013.01); *G01C 21/3617* (2013.01); *G06K 9/00791* (2013.01); *G06K 9/00845* (2013.01); *G06K 9/3258* (2013.01)

(58) Field of Classification Search
CPC . G06F 3/013; G01C 21/3608; G01C 21/3617; G06K 9/00791; G06K 9/00845; G06K 9/3258
USPC ..................................................... 340/995.16
See application file for complete search history.

(56) References Cited

U.S. PATENT DOCUMENTS

| | | | | |
|---|---|---|---|---|
| 9,372,344 | B2 * | 6/2016 | Ting ....................... | G02B 27/01 |
| 2013/0307771 | A1 * | 11/2013 | Parker ................. | G06F 3/04842 |
| | | | | 345/158 |
| 2015/0091793 | A1 * | 4/2015 | Lee ..................... | G06K 9/00597 |
| | | | | 345/156 |
| 2015/0170422 | A1 * | 6/2015 | Aoyama .............. | G02B 27/017 |
| | | | | 345/8 |

(Continued)

FOREIGN PATENT DOCUMENTS

KR 10-2013-0126197 A 11/2013

*Primary Examiner* — Kerri L McNally
(74) *Attorney, Agent, or Firm* — Birch, Stewart, Kolasch & Birch, LLP

(57) ABSTRACT

Provided are a navigation service assistance system based on a driver line of sight and a vehicle navigation system using the same. The navigation service assistance system recognizes in real time a direction at which a driver looks and a line of sight of the driver, using a sensor. The navigation service assistance system matches external image data and coordinates information based on the line of sight of the driver, using a map controller and extracts detailed information about a text, a place, a road, or the like at a matched position. Here, the map controller assists in enabling automatically extracted text information or a building, a place, a road, or the like to be set or changed as an intermediate point or a destination with only a simple operation of the driver.

17 Claims, 7 Drawing Sheets

(56) References Cited

U.S. PATENT DOCUMENTS

2019/0025910 A1* 1/2019 Gilra .................... G06F 3/0481
2019/0087067 A1* 3/2019 Hovden ................ G06F 16/954

* cited by examiner

※ LINE-OF-SIGHT RECOGNITION "A"
DETECTION OF POSITION (COORDINATES) INFORMATION

※ SERVICE INFORMATION DISPLAY

※ LOOK AT JUNCTION ROAD
  ↳ PATH COMPARIOSN INFORMATION SERVICE

※ SERVICE INFORMATION DISPLAY even in the process of driving a vehicle along a preset path without changing a destination or an intermediate point. For example, in a case where a driver is hesitant to clearly match or recognize the preset path at a junction or a crossroad guided through announcements with his/her line of sight, there is a problem in that the driver may go past or cause an accident when an accurate path is not rapidly checked.

Patent Document

Korean Unexamined Patent Application Publication No. 10-2013-0126197 (Published on Nov. 20, 2013)

NAVIGATION SERVICE ASSISTANCE SYSTEM BASED ON DRIVER LINE OF SIGHT AND VEHICLE NAVIGATION SYSTEM USING THE SAME

CROSS-REFERENCE TO RELATED APPLICATIONS

This application claims the priority of Korean Patent Application No. 10-2019-0110281, filed on Sep. 5, 2019, in the Korean Intellectual Property Office, the disclosure of which is hereby incorporated by reference in its entirety.

BACKGROUND

1. Technical Field

The present disclosure relates to a navigation service assistance system based on a driver line of sight and a vehicle navigation system using the same.

2. Related Art

Since convenience and safety of a driver should be sufficiently considered for vehicles, safety devices optimized for various vehicles in addition to passenger cars have been developed.

The vehicle safety devices that can be applied for general use may include a lane departure warning system that assists steering of a driver to prevent departure from a cruising lane during road traveling of a vehicle, a navigation system that guides a path up to a destination selected by a driver and ambient information based on the path, and so on.

The navigation system generally includes an audio device and a video device such that a driver can listen to music and see images during driving in addition to simply providing information about a path. An audio video navigation (AVN) system in which an audio device, a video device, and a navigation system are integrated has recently been installed in a vehicle.

However, since the conventional navigation system or AVN system is located at an upper end of a dashboard or at a center fascia of the vehicle, a driver changes a line-of-sight direction to check information displayed on the navigation system or the AVN system, and thus can invite danger during vehicle driving.

Especially, to reset a path search option or change a preset path like resetting a destination or an intermediate point during vehicle driving, a time for which a driver does not see forward is increased, and an operation is required with one hand. Thus, the danger is inevitably raised.

Therefore, a technique capable of remarkably reducing a search time when a new section or destination is searched and providing additional detailed information based on a change in path is disclosed in Korean Unexamined Patent Application Publication No. 10-2013-0126197 (Nov. 20, 2013).

However, in the conventional navigation system or AVN system, a driver is still in danger because the driver inevitably inputs a desired destination or intermediate point by a touch operation using one hand when changing the destination or the intermediate point. Thus, the conventional navigation system or AVN system is sometimes set in a locked state during driving to prevent a driver from violating obligation to see forward or an operation with one hand.

Further, a method of inputting a destination or an intermediate point without a touch operation such as a method of recognizing a voice is also applied. In this case, if a driver does not previously know information about an accurate name or address of the destination or the intermediate point, great inconvenience of search may be caused.

In addition, there is a problem in that it is difficult to accurately match a real road situation with announcements of the navigation system even

SUMMARY

Various embodiments are directed to providing a navigation service assistance system capable of assisting in recognizing a driver line of sight to automatically detect and set an intermediate point or a destination based on a driver line of sight, and a vehicle navigation system using the same.

Also, various embodiments assist in automatically extracting various pieces of content information such as a text in a direction at which a driver looks, a preference to a building or a place matched with a position at which a driver looks, a postscript, a trade name, a type of business, a menu, and information about evaluation. Various embodiments are directed to providing a navigation service assistance system capable of assisting in selecting, by a driver, a place or building of interest as an intermediate point or a destination in real time with reference to the content information that is automatically extracted, and a vehicle navigation system using the same.

Also, various embodiments assist in detecting a road in a direction at which a driver looks during driving and information about the road in real time, to compare in real time the information about the road with information about a path preset in a navigation system or the like, and to enable a driver to check a result of the comparison. That is, various embodiments are directed to providing a navigation service assistance system capable of comparing in real time a path preset in a navigation system or the like and announcements based on the preset path with path information based on a road at which a driver looks and enabling a driver to check a result of the comparison, and a vehicle navigation system using the same.

Objects of the present disclosure are not limited by these objects mentioned above, and other unmentioned objects and advantages of the present disclosure can be understood by the following description, and will be clearly understood by embodiments of the present disclosure. Further, it can be easily found that the objects and advantages of the present disclosure can be realized by means defined in the claims and combinations thereof.

To achieve the objects described above, a navigation service assistance system according to an embodiment of the present disclosure recognizes in real time a direction at which a driver looks and a line of sight which the driver has using a sensor. The navigation service assistance system matches external image data with coordinates information based on the line of sight of a driver using a map controller, and extracts detailed information about a text, a place, a road, etc. of a matched position. The map controller assists in setting and changing text information, a building, a place, a road, or the like that are automatically extracted to and into an intermediate point or a destination with only a simple operation of a driver.

Further, the map controller of the navigation service assistance system according to the present disclosure concretely extracts various pieces of content information such as information about a preference, a postscript, a trade name, a type of business, a menu, and evaluation that are related to a text, a building or a place matched according to the driver line of sight. The map controller assists in enabling various pieces of related information to be checked with various content display devices such as an image display device or mobile communication device based on extended reality, an AVN system, a navigation system, a head-up display (HUD), and a digital cluster.

In addition, a vehicle navigation system using the navigation service assistance system according to the present disclosure detects a position of a road at which a driver looks during driving and information about the road in real time, and compares the information with path information preset in a navigation system. The vehicle navigation system assists in enabling the driver to check a result of the comparison using display devices based on sound and augmented reality.

The navigation service assistance system according to the embodiment of the present disclosure and the vehicle navigation system using the same enable a place or position, extracted in real time on the basis of the line of sight of the driver, to be immediately set to an intermediate point or a destination. Therefore, the navigation service assistance system and the vehicle navigation system using the same can assist in enabling the driver to set and change the intermediate point or the destination in a safe and easy manner without performing a separate touch operation on the navigation system or an operation for recognizing a voice.

Further, the navigation service assistance system of the present disclosure and the vehicle navigation system using the same assist in enabling a driver to conveniently and rapidly check various pieces of information about a place or position extracted in real time on the basis of the line of sight of the driver. Therefore, the navigation service assistance system and the vehicle navigation system using the same provide convenience to enable the driver to more easily find and set information about a desired intermediate point or destination even if the driver does not previously know information about an accurate name or address of the desired intermediate point or destination.

In addition, the navigation service assistance system of the present disclosure and the vehicle navigation system using the same assist in enabling a driver to check in real time a result of comparing a path preset in the navigation system and announcements based on the preset path with a path of a road at which a driver looks. Therefore, the navigation service assistance system of the present disclosure and the vehicle navigation system using the same assist in enabling the driver to accurately check and drive only the preset path, and thereby have an effect capable of improving all of safety, satisfaction, and reliability of the driver.

Effects according to the present disclosure are not limited to the effects mentioned above, and other unmentioned effects can be clearly understood to those skilled in the art from the following description.

DETAILED DESCRIPTION

Figure 1:
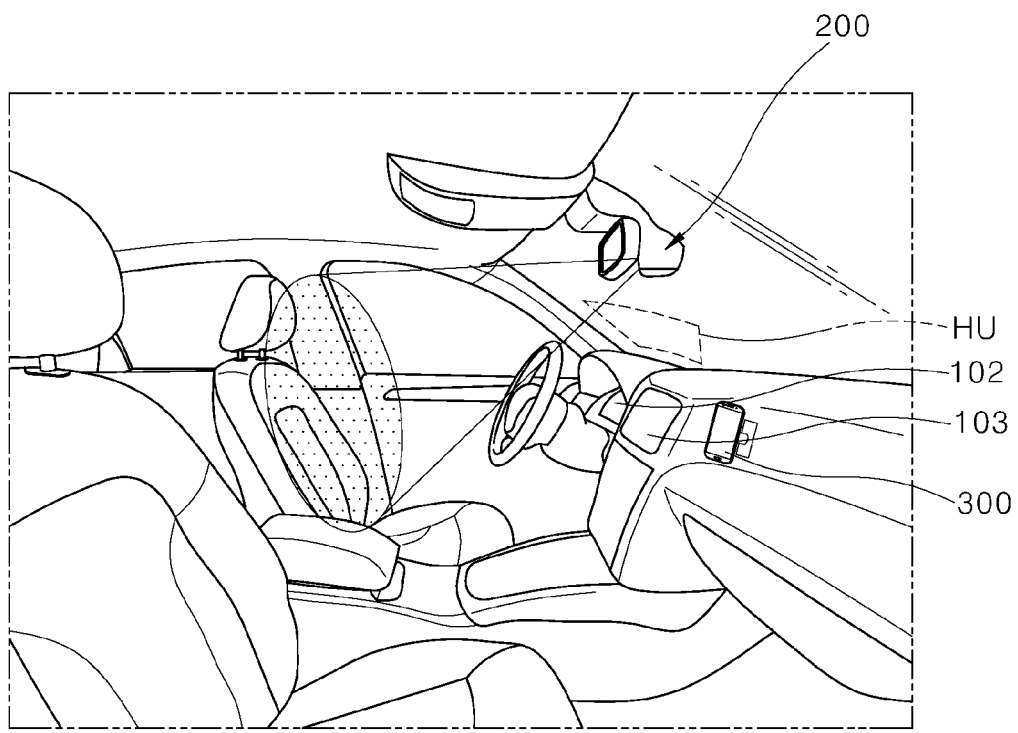
FIG. 1 is a layout configuration diagram of a navigation service assistance system according to an embodiment of the present disclosure and a vehicle navigation system using the same.

The aforementioned objects, features and advantages will be described in detail below with reference to the accompanying drawings, and thus one with ordinary skill in the relevant art can easily carry out the technical spirit of the present disclosure. Further, in the description of the present disclosure, when it is determined that the detailed description of the related art would obscure the gist of the present disclosure, the detailed description thereof will be omitted. In the drawings, it is noted that the same reference numerals or signs will be used to designate identical or equivalent elements in the drawings.

Vehicles to which a navigation service assistance system according to the present disclosure or a vehicle navigation system including the navigation service assistance system is applied may be autonomous vehicles in addition to passenger cars, freight vehicles and special-purpose vehicles. Here, the autonomous technique refers to a self-driving technique, and the autonomous vehicle refers to a vehicle that is driven with no or least operation of a user. For example, the autonomous technique may include all of a technique for maintaining a lane during driving, a technique for autonomously controlling a speed such as adaptive cruise control, a technique for autonomously traveling along a designated path, a technique for autonomously setting a path when a designation is set and traveling along the path, and so on.

The autonomous vehicle can determine a moving path and a driving plan using at least one of object information detected from map data and sensor information and object information acquired from an external device, and control a drive to drive itself according to the determined moving path and driving plan.

Object identification information about various objects disposed in a space (e.g., a road) where the autonomous vehicle travels may be included in the map data. For example, object identification information about immovable objects such as a road lamp, a rock and a building and movable objects such as a vehicle and a pedestrian may be included in the map data. The object identification information may include a name, a type, a distance, a position, and so on.

Further, vehicles to which the navigation service assistance system according to the present disclosure or the vehicle navigation system including the navigation service assistance system is applied may include all of vehicles with only an internal combustion engine, hybrid vehicles with both an internal combustion engine and an electric motor, and electric vehicles with only an electric motor, and include trains, motorcycles, etc. in addition to the vehicles. In this case, the autonomous vehicle can be regarded as a robot having an autonomous travel function.

Hereinafter, exemplary embodiments according to the present disclosure will be described in detail with reference to the accompanying drawings.

Figure 2:
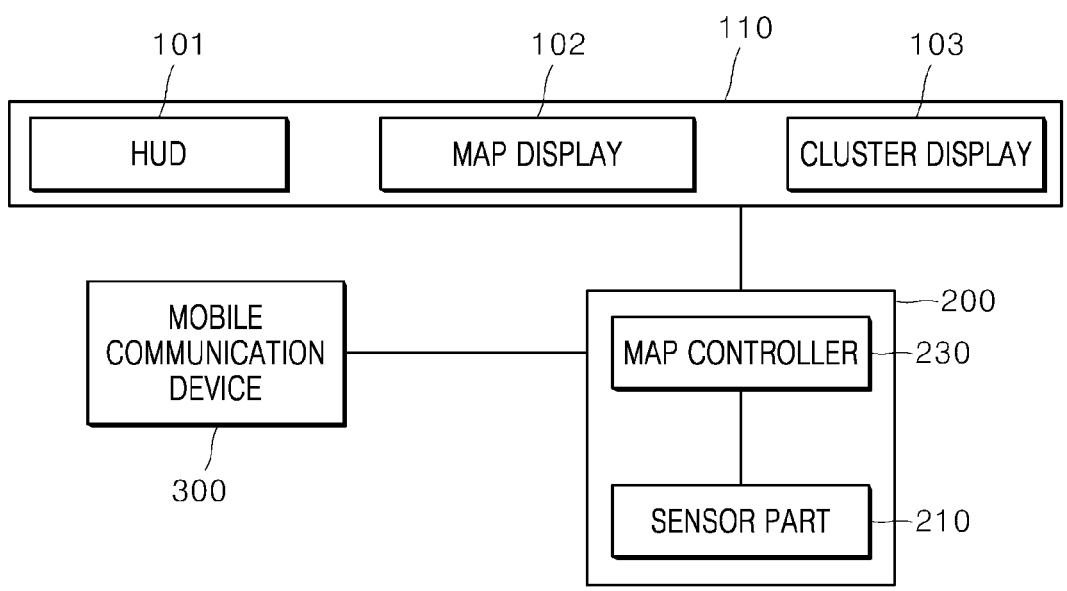
FIG. 2 is a configuration block diagram concretely illustrating the navigation service assistance system and the vehicle navigation system that are illustrated in FIG. 1.

FIG. 1 is a layout configuration diagram of a navigation service assistance system according to an embodiment of the present disclosure and a vehicle navigation system using the same. FIG. 2 is a configuration block diagram concretely illustrating the navigation service assistance system and the vehicle navigation system that are illustrated in FIG. 1.

Referring to FIGS. 1 and 2, the vehicle navigation system may include a navigation service assistance system 200 and a content display device 110, and may further include a mobile communication device 300 as needed.

The navigation service assistance system 200 matches coordinates information, based on a direction at which a driver looks and a line of sight of the driver, with external image data, and detects name or position information about at least one of a text, a place, a building, and a road at which the driver looks. The detected name or position information about a text, a place, a building, or a road is displayed on the content display device 110, and thereby the content display device 110 assists in enabling the driver to check related information with an image and a voice.

Further, the navigation service assistance system 200 temporarily sets the detected text, place, building or road as an intermediate point or a destination to extract a path, compares a preset previous path with the extracted temporary path, and causes information about a result of the comparison to be displayed through the content display device 110. Therefore, the driver can check the information about a result of the comparison with an image and a voice, and transmit a reset command of the intermediate point or the destination with a preset operation or voice.

The navigation service assistance system 200 resets the detected text, place, building or road as the intermediate point or the destination according to the selection of the driver determined through the preset operation and voice recognition. The navigation service assistance system 200 shares the destination or intermediate point reset information in real time with the content display device 110 and the mobile communication device 300.

The content display device 110 or the mobile communication device 300 reflects the destination or intermediate point reset information received from the navigation service assistance system 200 to reset map data, and performs navigation service with an image and a voice according to the reset map data.

The content display device 110 or the mobile communication device 300 may be formed as a communication and image display device based on extended reality (XR). In other words, the content display device 110 may include an audio video navigation (AVN) system, a head-up display (HUD) module 101, a map display 102, a digital cluster display 103, etc. in addition to the mobile communication device 300 based on XR.

The XR is a generic term for virtual reality (VR), augmented reality (AR), and mixed reality (MR). VR technology is computer graphic technology that provides an object or a background of the real world as only a CG image. AR technology is computer graphic technology that together provides a virtually produced CG image on a real object image. MR technology is computer graphic technology that merges virtual objects with the real world and provides the virtual objects merged with the real world.

The MR technology is similar to the AR technology in that a real object and a virtual object are shown together. However, there is a difference in that the virtual object is used to make up for the real object in the AR technology, whereas the virtual object and the real object are used at an equivalent level in the MR technology.

XR technology can be applied to a head-mount display (HMD), the HUD 101, the mobile communication device 300 such as a portable phone and a tablet PC, the map display 102, the cluster display 103, a laptop computer, a desktop computer, a television (TV), digital signage, and so on. A device to which the XR technology is applied may be called an XR device. Here, the XR device may be included in wearable devices, home appliances, digital signage, vehicles, immovable robots, or movable robots to which AI technology is applied, in addition to the content display device 110 provided in a vehicle.

Meanwhile, communication technology applied to the mobile communication device 300 and the navigation service assistance system 200 includes a global system for mobile communication (GSM), code division multi access (CDMA), long term evolution (LTE), 5G, wireless LAN (WLAN), wireless-fidelity (Wi-Fi), Bluetooth, radio frequency identification (RFID), infrared data association (IrDA), ZigBee, near field communication (NFC), and so on.

Figure 3:
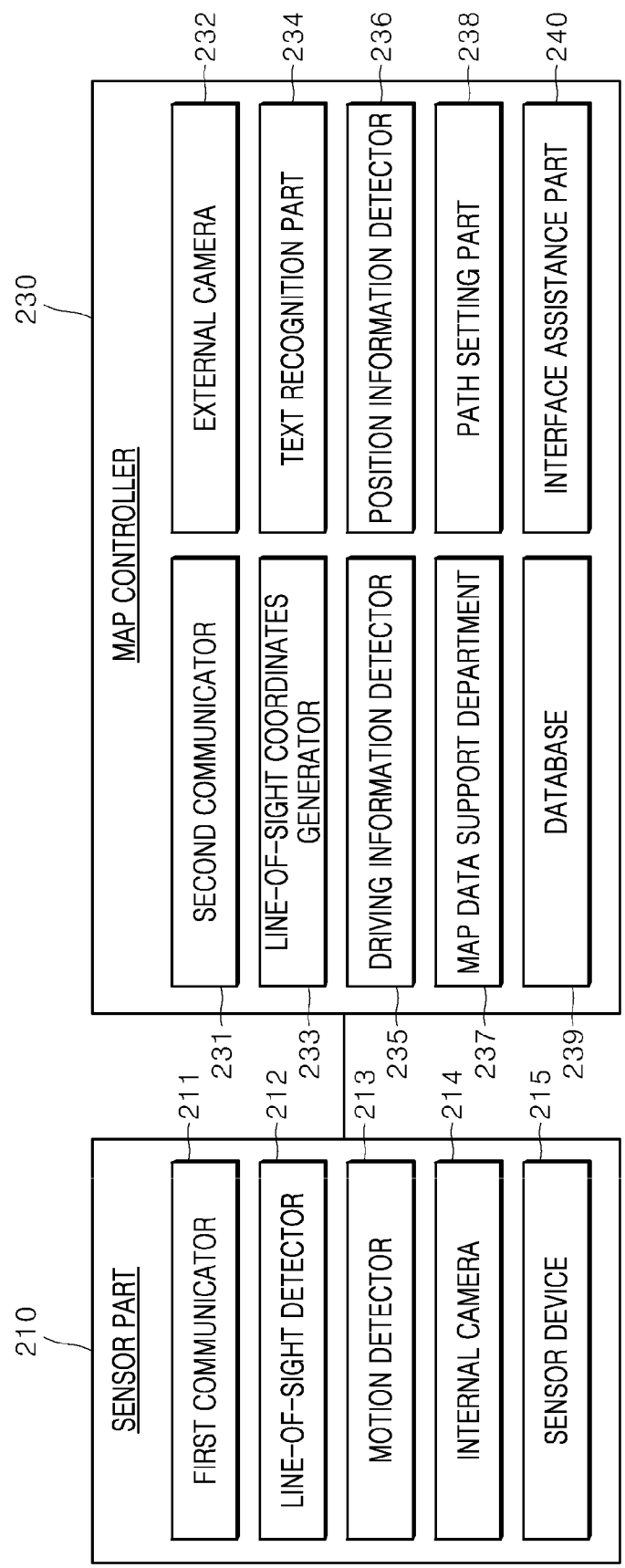
FIG. 3 is a configuration block diagram concretely illustrating a sensor and a map controller that are illustrated in FIG. 2.

FIG. 3 is a configuration block diagram concretely illustrating a sensor and a map controller that are illustrated in FIG. 2.

Referring to FIGS. 2 and 3, a sensor part 210 of the navigation service assistance system 200 checks a ride state of a driver, generates in real time eyeball motion coordinates information based on the direction at which the driver looks and the line of sight which the driver has, and transmits the eyeball motion coordinates information to a map controller 230. To this end, the sensor part 210 includes at least one of a first communicator 211, a line-of-sight detector 212, a motion detector 213, an internal camera 214, and a sensor device 215.

The internal camera 214 of the sensor part 210 generates image data of the driver in the vehicle, and transmits the image data to the motion detector 213. The internal camera 214 may be configured to include a high-resolution infrared camera having a wavelength band of 800 to 900 nm and an image sensor.

The sensor device 215 generates a motion detection signal of the driver or an eyeball motion detection signal of the driver using at least one of a radar, a laser scanner, and an advanced driver assistance system (ADAS) sensor.

The motion detector 213 matches the image data of the driver from the internal camera 214 with the motion detection signal of the driver or the eyeball motion detection signal of the driver from the sensor device 215, and detects a motion state of an eyeball of the driver.

The motion detector 213 transmits motion image information of the eyeball of the driver to the line-of-sight detector 212.

The line-of-sight detector 212 transmits the line-of-sight information of the driver including the image data of the driver and at least one signal or information of the eyeball motion detection signal and the eyeball motion image information of the driver to the map controller 230 through the first communicator 211.

The map controller 230 of the navigation service assistance system 200 extracts eyeball motion coordinates information using the line-of-sight information of the driver received from the line-of-sight detector 212, that is, the image data of the driver and at least one signal or information of the eyeball motion detection signal and the eyeball motion image information of the driver. Further, the map controller 230 matches the eyeball motion coordinates information of the driver with external image data, and detects information about at least one of a text, a place, a building, and a road at which the driver looks. The map controller 230 assists in causing the text, the place, the building or the road detected according to the selection of the driver to be set and changed as an intermediate point or a destination with only a simple operation of the driver.

Especially, when the map controller 230 matches the eyeball motion coordinates information with the external image data and detects the text, the place, the building, and the road at which the driver looks, the map controller 230 extracts pieces of content information, such as information about a preference, a postscript, a trade name, a type of business, a menu, and evaluation which are related to the text, the place, the building, and the road that are detected, from a database. Here, the pieces of content information related to the text, the place, the building, and the road may be received and extracted through an external content assistance server or the like.

The map controller 230 assists in enabling the various pieces of content information extracted in this way to be displayed on the mobile communication device 300 of the driver and the content display device 110 including the AVN system, the map display 102, the HUD 101, the digital cluster display 103 and so on.

When the map controller 230 matches the eyeball motion coordinates information with the external image data, and detects the text, the place, the building, and the road at which the driver looks, the map controller 230 detects names of the text, the place, the building, and the road that are detected or trade name or position information, temporarily sets the names or the trade name or position information as the intermediate point or the destination, and extracts a path. The map controller 230 is configured such that information about a result of comparing this temporary path with the previously preset path is transmitted to be able to be displayed on the content display device 110, and the driver checks the information about a result of the comparison and resets the information about a result of the comparison as the intermediate point or the destination through a preset operation or voice recognition.

In addition, when the map controller 230 matches the eyeball motion coordinates information with the external image data and detects the road at which the driver looks during driving, the map controller 230 detects a position of the road at which the driver looks during driving and a name or a unique number of the road in real time. The map controller 230 compares path information of the road, at which the driver looks, with path information preset in the navigation system or the like, for a preset period or the preset number of times. In this case, the map controller 230 assists in enabling the result of the comparison to be displayed on the content display device 110, and enabling the driver to check in real time the result of the comparison of the path preset in the navigation system or the like and announcements based on the preset path information, with the path of the road at which the driver looks.

Hereinafter, detailed components and main operating technique features of the map controller 230 will be described more concretely.

The map controller 230 illustrated in FIG. 3 includes a second communicator 231, an external camera 232, an line-of-sight coordinates generator 233, a text recognition part 234, a driving information detector 235, a position information detector 236, a map data assistance part 237, a path setting part 238, a database 239, and an interface assistance part 240.

The second communicator 231 transmits the eyeball motion coordinates information, received in real time from the first communicator 211, to the line-of-sight coordinates generator 233. The second communicator 231 receives various pieces of content information, such as information about a preference a postscript, a trade name, a type of business, a menu, and evaluation which are related to a text, a place, a building, or a road that is specified, under the control of the interface assistance part 240.

The external camera 232 captures in real time an image of an external environment of the vehicle corresponding to a radius of a region at which the driver looks, using at least one image sensor, and generates external image data according to the captured result.

The line-of-sight coordinates generator 233 matches the eyeball motion coordinates information and the external image data that are input in real time, and generates line-of-sight coordinates information corresponding to a line of sight of the driver on the basis of a size of the external image data and eyeball motion coordinates.

The text recognition part 234 detects text information through a process of partitioning an image in an external image data partition region corresponding to the line-of-sight coordinates information.

The position information detector 236 detects a road, a building, a place, a trade name, or a place name in the external image data partition region corresponding to the line-of-sight coordinates information, and detects name or position information about the road, the building, the place, the trade name, or the place name, and position information about the road, the building, the place, or the place name based on the text information.

The map data assistance part 237 provides map data to the driving information detector 235, the position information detector 236, and the path setting part 238.

The driving information detector 235 matches coordinates information based on GPS positions and the map data, and detects driving information of the vehicle and preset path information in real time. The driving information detector 235 sets the position information about the road, the building, or the place detected by the position information detector 236 as a temporary intermediate point or a temporary destination, and generates temporary path information about the temporary intermediate point or the temporary destination.

The interface assistance part 240 checks whether or not selection of the driver exists, through a preset operation and voice recognition, and transmits the selected result to the driving information detector 235 and the path setting part 238. Further, when the name or position information about the road, the building, the place, or the place name is detected by the position information detector 236, the interface assistance part 240 searches and collects the various pieces of content information such as information about a postscript, a trade name, a type of business, a menu, and evaluation, which are related to the road, the building, the place, the trade name or the place name, using the detected name or position information, and shares the various pieces of content information with the content display device 110 and the mobile communication device 300 in real time.

The path setting part 238 resets the position information about the road, the building, or the place, detected by the position information detector 236 according to the selected result from the interface assistance part 240, as the intermediate point or the destination. The path setting part 238 regenerates path information about the reset intermediate point or destination, and shares position information about the reset intermediate point or destination with the content display device 110 and the mobile communication device 300 in real time.

Meanwhile, the database 239 stores the various pieces of content information such as information about a postscript, a trade name, a type of business, a menu, and evaluation related to the road, the building, the place, the trade name, or the place name that is preset, and shares the various pieces of content information with the interface assistance part 240 and the content display device 110.

Figure 4:
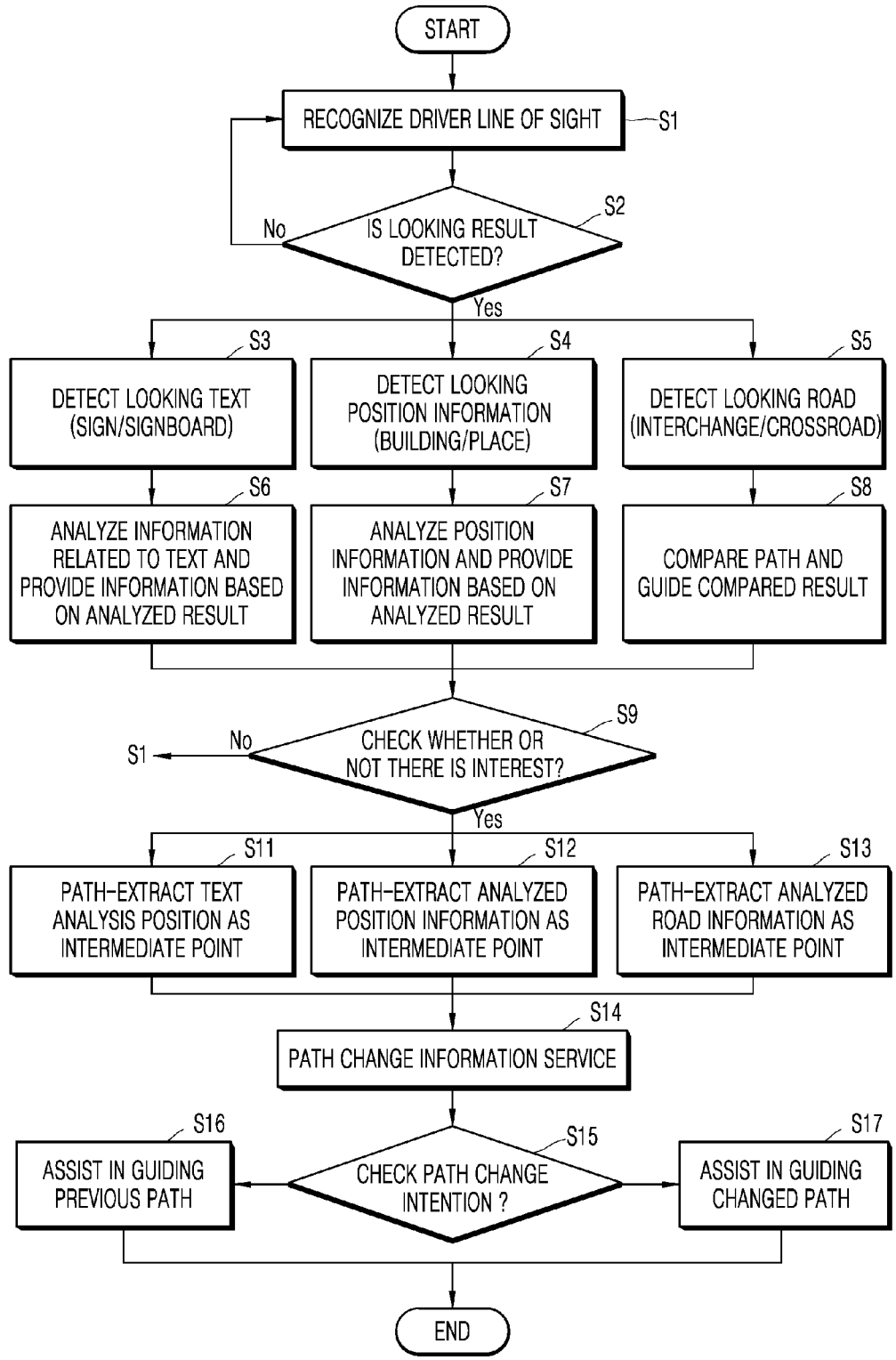
FIG. 4 is a flow chart illustrating a navigation service assistance method of the map controller illustrated in FIG. 3 in order.

FIG. 4 is a flow chart illustrating a navigation service assistance method of the map controller illustrated in FIG. 3 in order.

Referring to FIGS. 3 and 4, the sensor part 210 checks a ride state of the driver first, generates in real time eyeball motion coordinates information based on a direction at which the driver looks and a line of sight which the driver has, and transmits the eyeball motion coordinates information to the map controller 230 (S1).

Thus, the map controller 230 checks whether the eyeball motion coordinates information is maintained or repeated for more than a preset period or more than the preset number of times, and checks and determines whether or not the driver looks at a specific text, place, position, building, or road (S2). In this case, in a case where the eyeball motion coordinates information is maintained or repeated for more than the preset period or more than the preset number of times, the map controller 230 determines that the driver looks at a specific text, place, position, building, or road.

Figure 5:
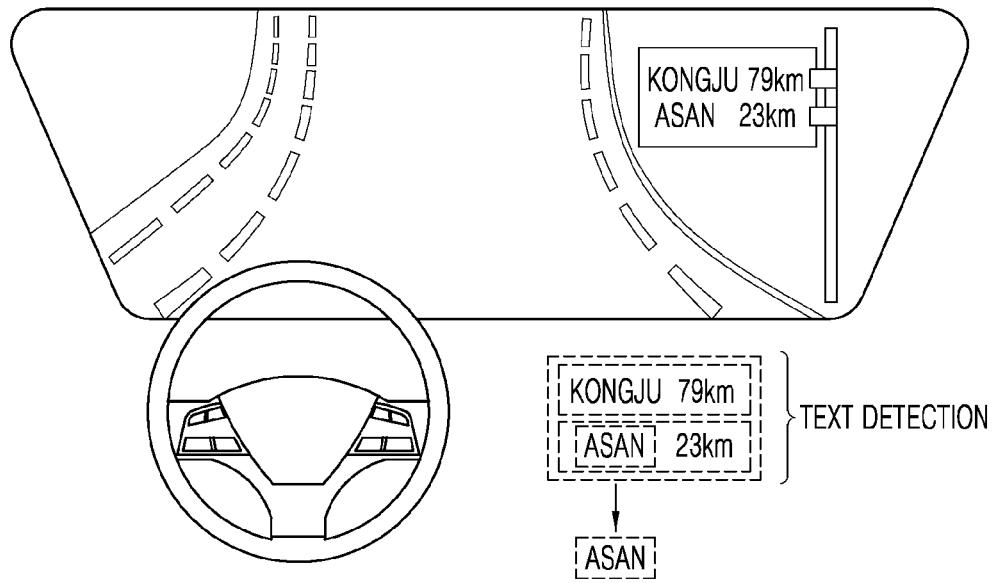
FIG. 5 is a diagram illustrating a text detection method, based on the line of sight of a driver, of the map controller illustrated in FIG. 3.
Figure 6:
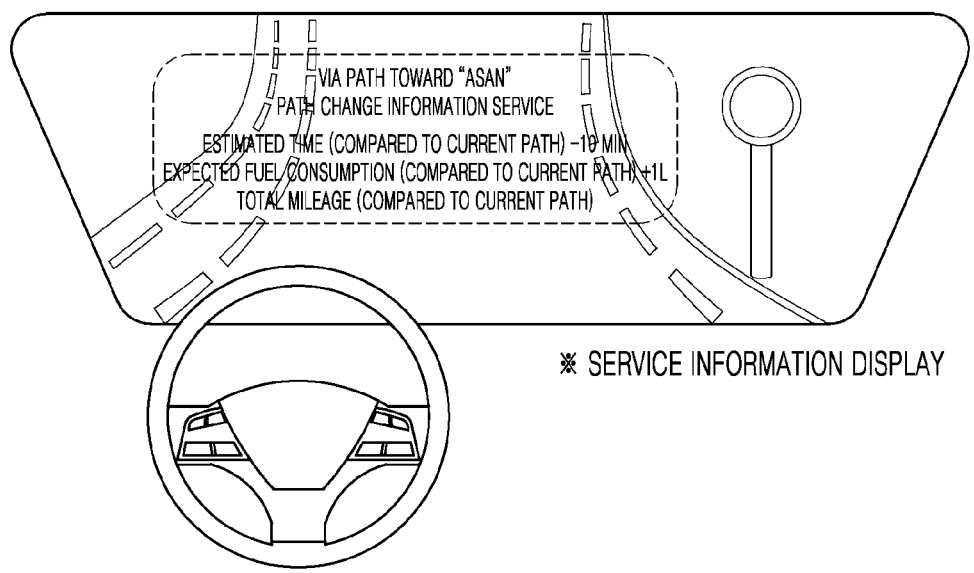
FIG. 6 is a diagram illustrating a path reset information service method of the map controller illustrated in FIG. 3.

FIG. 5 is a diagram illustrating a text detection method, based on the line of sight of a driver, of the map controller illustrated in FIG. 3. FIG. 6 is a diagram illustrating a path reset information service method of the map controller illustrated in FIG. 3.

First, referring to FIG. 5, the line-of-sight coordinates generator 233 of the map controller 230 matches the eyeball motion coordinates information and external image data that are input in real time, and generates line-of-sight coordinates information corresponding to the line of sight of the driver on the basis of a size of the external image data and eyeball motion coordinates.

Thus, the text recognition part 234 of the map controller 230 senses and detects text information through a process of partitioning an image in an external image data partition region corresponding to the line-of-sight coordinates information. The text recognition part 234 can extract names of a road, a building, a place, a trade name, or a place name through text detection of a partition region corresponding to the line-of-sight coordinates and a partition region coinciding with the line-of-sight coordinates (S3).

Thus, the position information detector 236 can detect name or position information about the road, the building, the place, the trade name, or the place name, and position information about the road, the building, the place, or the place name based on the text information.

Further, when the name or position information about the road, the building, the place, or the place name is detected by the position information detector 236, the interface assistance part 240 searches and collects the various pieces of content information such as information about a postscript, a trade name, a type of business, a menu, and evaluation related to the road, the building, the place, the trade name, or the place name, using the detected name or position information, and shares the various pieces of content information with the content display device 110 and the mobile communication device 300 in real time (S6).

The position information detector 236 or the driving information detector 235 checks whether the eyeball motion coordinates information is maintained or repeated for more than the preset period or more than the preset number of times, and checks again whether or not there is an interest of the driver (S9).

If it is determined that there is the interest of the driver, the driving information detector 235 matches coordinates information based on GPS positions and the map data, and detects driving information of the vehicle and preset path information in real time. The driving information detector 235 sets the position information about the road, the building, or the place detected by the position information detector 236 as a temporary intermediate point or a temporary destination, and generates temporary path information about the temporary intermediate point or the temporary destination (S11 and S14).

Referring to FIG. 6, the driving information detector 235 transmits information about a result of comparing the temporary path information with the previously preset path to be able to be displayed on the content display device 110, enabling the driver to check the information about a result of the comparison, and assists in enabling the driver to reset the information about a result of the comparison as the intermediate point or the destination through a preset operation or voice recognition (S14).

In this case, the interface assistance part 240 checks whether or not the selection of the driver exists, through the preset operation or the voice recognition, and transmits the selected result to the driving information detector 235 and the path setting part 238 (S15).

The path setting part 238 resets the position information about the road, building, or place, detected by the position information detector 236 according to the selected result from the interface assistance part 240, as the intermediate point or the destination. The path setting part 238 regenerates path information about the reset intermediate point or destination, and shares position information about the reset intermediate point or destination with the content display device 110 and the mobile communication device 300 in real time (S17).

Figure 7:
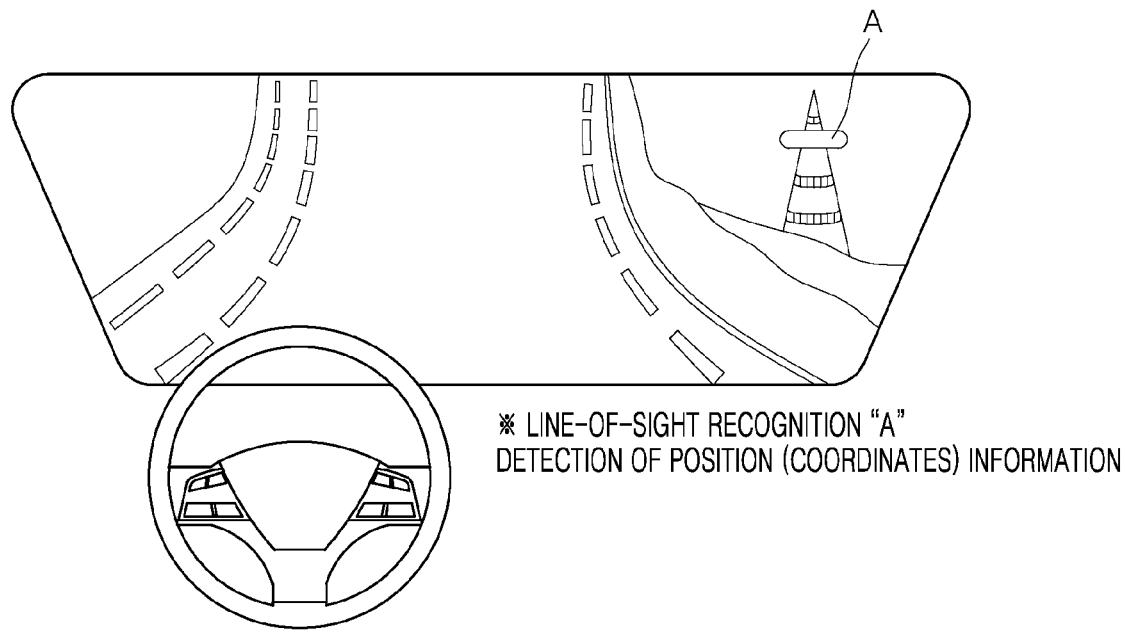
FIG. 7 is a diagram illustrating a looking position detection method, based on the line of sight of a driver, of the map controller illustrated in FIG. 3.
Figure 8:
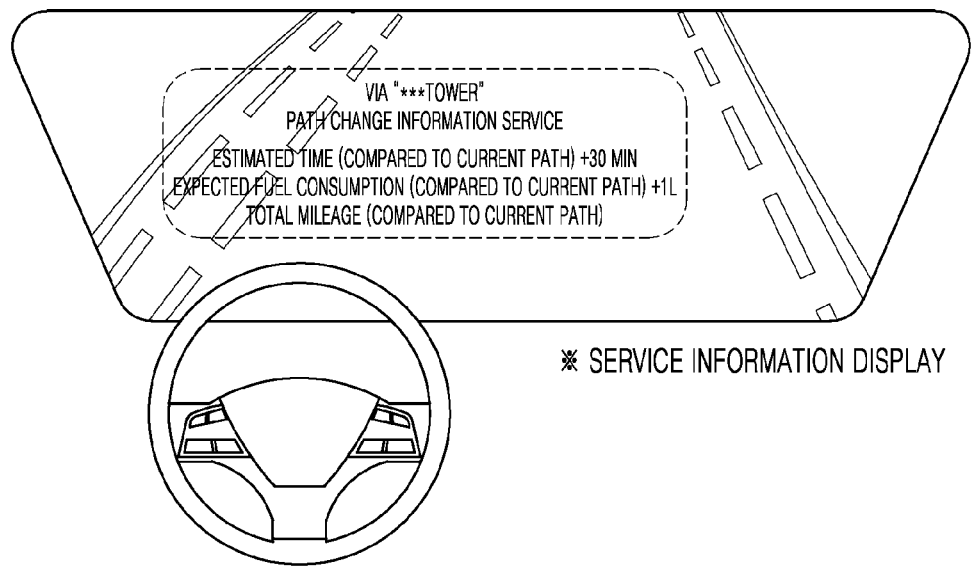
FIG. 8 is another diagram illustrating the path reset information service method of the map controller illustrated in FIG. 3.

FIG. 7 is a diagram illustrating a looking position detection method, based on the line of sight of a driver, of the map controller illustrated in FIG. 3. FIG. 8 is another diagram illustrating the path reset information service method of the map controller illustrated in FIG. 3.

First, referring to FIG. 7, the map controller 230 checks whether the eyeball motion coordinates information is maintained or repeated for more than the preset period or more than the preset number of times, and checks and determines whether or not the driver looks at a specific text, place, position, building, or road (S2). In this case, in the case where the eyeball motion coordinates information is maintained or repeated for more than the preset period or more than the preset number of times, the map controller 230 determines that the driver looks at a specific text, place, position, building, or road.

Thus, the position information detector 236 of the map controller 230 detects a road, a building, a place, a trade name, or a place name in the external image data partition region corresponding to the line-of-sight coordinates information, and detects name or position information about the road, the building, the place, the trade name, or the place name, and position information about the road, the building, the place, or the place name based on the text information (S4).

Further, when the name or position information about the road, the building, the place, or the place name is detected by the position information detector 236, the interface assistance part 240 searches and collects the various pieces of content information, such as information about a postscript, a trade name, a type of business, a menu, and evaluation related to the road, the building, the place, the trade name, or the place name, using the detected name or position information, and shares the various pieces of content information with the content display device 110 and the mobile communication device 300 in real time (S7).

The position information detector 236 or the driving information detector 235 checks whether the eyeball motion coordinates information is maintained or repeated for more than the preset period or more than the preset number of times, and checks again whether or not there is an interest of the driver (S9).

If it is determined that there is the interest of the driver, the driving information detector 235 matches the coordinates information based on GPS positions and the map data, and detects the driving information of the vehicle and the preset path information in real time. The driving information detector 235 sets the position information about the road, the building, or the place detected by the position information detector 236 as the temporary intermediate point or the temporary destination, and generates the temporary path information about the temporary intermediate point or the temporary destination (S11 and S14)

Referring to FIG. 8, the driving information detector 235 transmits information about a result of comparing the temporary path information with the previously preset path to be able to be displayed on the content display device 110, and assist in enabling the driver to check the information about a result of the comparison, and enabling the driver to reset the information about a result of the comparison as the intermediate point or the destination through the preset operation or the voice recognition (S14).

In this case, the interface assistance part 240 checks whether or not the selection of the driver exists, through the preset operation or the voice recognition, and transmits the selected result to the driving information detector 235 and the path setting part 238 (S15).

The path setting part 238 resets the position information about the road, building, or place, detected by the position information detector 236 according to the selected result from the interface assistance part 240, as the intermediate point or the destination. The path setting part 238 regenerates the path information about the reset intermediate point or destination, and shares the position information about the reset intermediate point or destination with the content display device 110 and the mobile communication device 300 in real time (S17).

In this case, the driving information detector 235 can transmit and assist information about a result of comparing the temporary path information with the previously preset path so as to be able to display it on the content display device 110 based on the extended reality. Thus, the content display device 110 realized with, for example, the image content of the extended reality can display the information about a result of comparing the temporary path information with the previously preset path as a content based on the extended reality of the augmented reality or the like.

If the driver maintains the existing path without changing the path information, the realization of the image content of the extended reality of the content display device 110 can be stopped and terminated. The content display device 110 can guide the map information guided without a change in path through a screen of the existing navigation system. However, the content display device 110 can realize only path information changed by the temporary path information or the line of sight according to the preset option information as the image content of the extended reality, and can also set or change the resultant color as needed.

Figure 9:
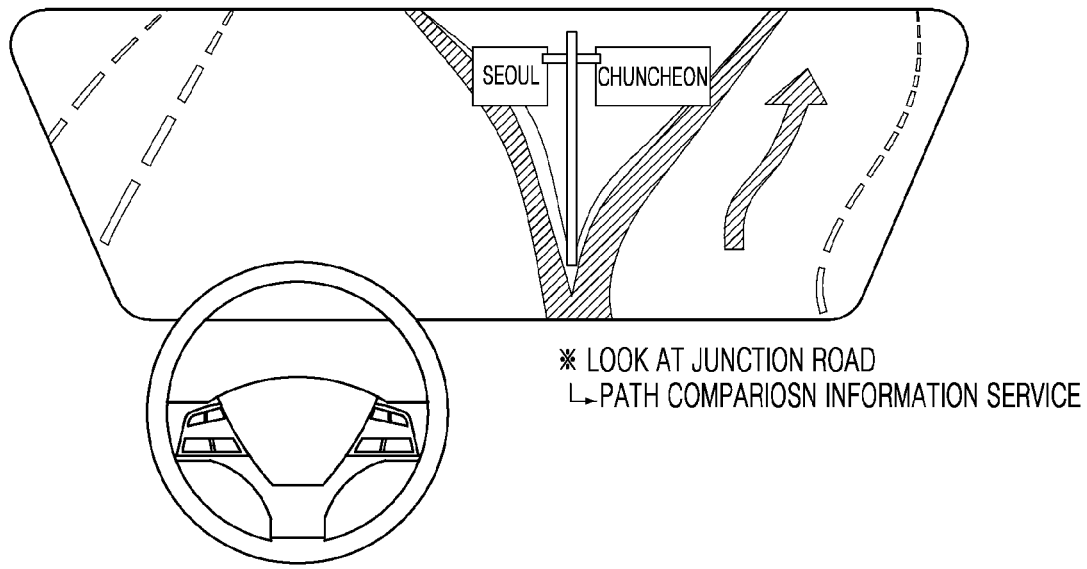
FIG. 9 is a diagram illustrating a looking road detection method, based on the line of sight of a driver, of the map controller illustrated in FIG. 3.
Figure 10:
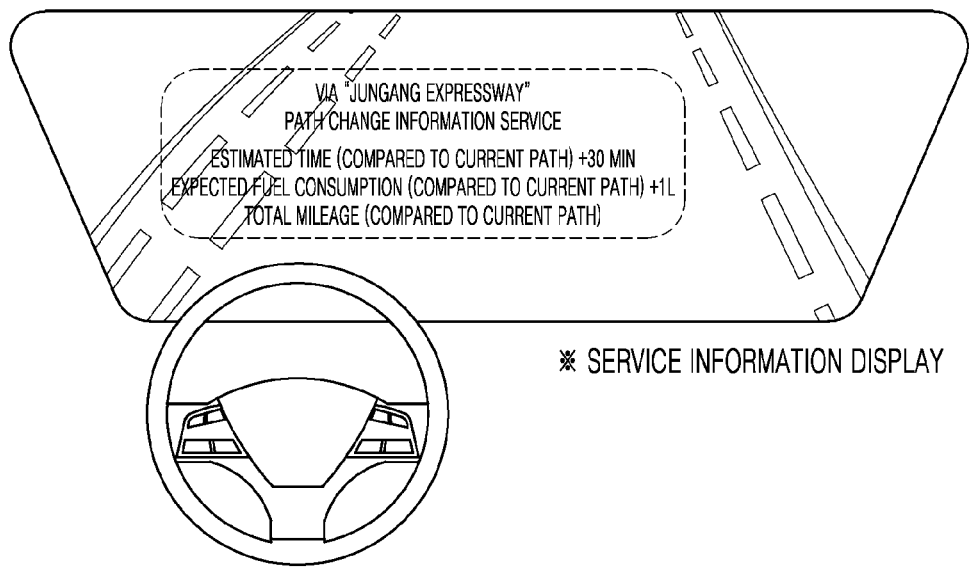
FIG. 10 is a diagram illustrating a path comparison result service method of the map controller illustrated in FIG. 3.

FIG. 9 is a diagram illustrating a looking road detection method, based on the line of sight of a driver, of the map controller illustrated in FIG. 3. FIG. 10 is a diagram illustrating a path comparison result service method of the map controller illustrated in FIG. 3.

First, referring to FIG. 9, the map controller 230 checks whether the eyeball motion coordinates information is maintained or repeated for more than the preset period or more than the preset number of times, and checks and determines whether or not the driver looks at a specific road and the like (S2). In this case, in the case where the eyeball motion coordinates information is maintained or repeated for more than the preset period or more than the preset number of times, the map controller 230 determines that the driver looks at a specific road and the like.

Thus, the position information detector 236 of the map controller 230 detects a name or a unique number of a road in the external image data partition region corresponding to the line-of-sight coordinates information (S5). That is, when the position information detector 236 matches the eyeball motion coordinates information and the external image data and detects the road at which the driver looks during driving, the position information detector 236 detects in real time the position of the road, at which the driver looks during driving, and the name or the unique number of the road.

Next, the driving information detector 235 generates path information of the road at which the driver looks for the preset period or the preset number of times, and compares the generated path information with the path information preset in the navigation system or the like. That is, the driving information detector 235 sets the road, at which the driver looks for the preset period or the preset number of times, as the temporary intermediate point or the temporary destination, and generates the temporary path information about the temporary intermediate point or the temporary destination (S11 and S14)

Referring to FIG. 8, the driving information detector 235 transmits the information about a result of comparing the temporary path information with the previously preset path to be able to be displayed on the content display device 110, and assists in enabling the driver to check the information about a result of the comparison. The driving information detector 235 assists in enabling the driver to display the information about a result of the comparison on the content display device 110, and enabling the driver to check in real time the result of comparing the path preset in the navigation system or the like and the announcements based on the preset path, with the path of the road at which the driver looks.

Accordingly, the navigation service assistance system assist in enabling the driver to accurately check and drive only the preset path, and thereby can improve all of safety, satisfaction, and reliability of the driver.

Figure 11:
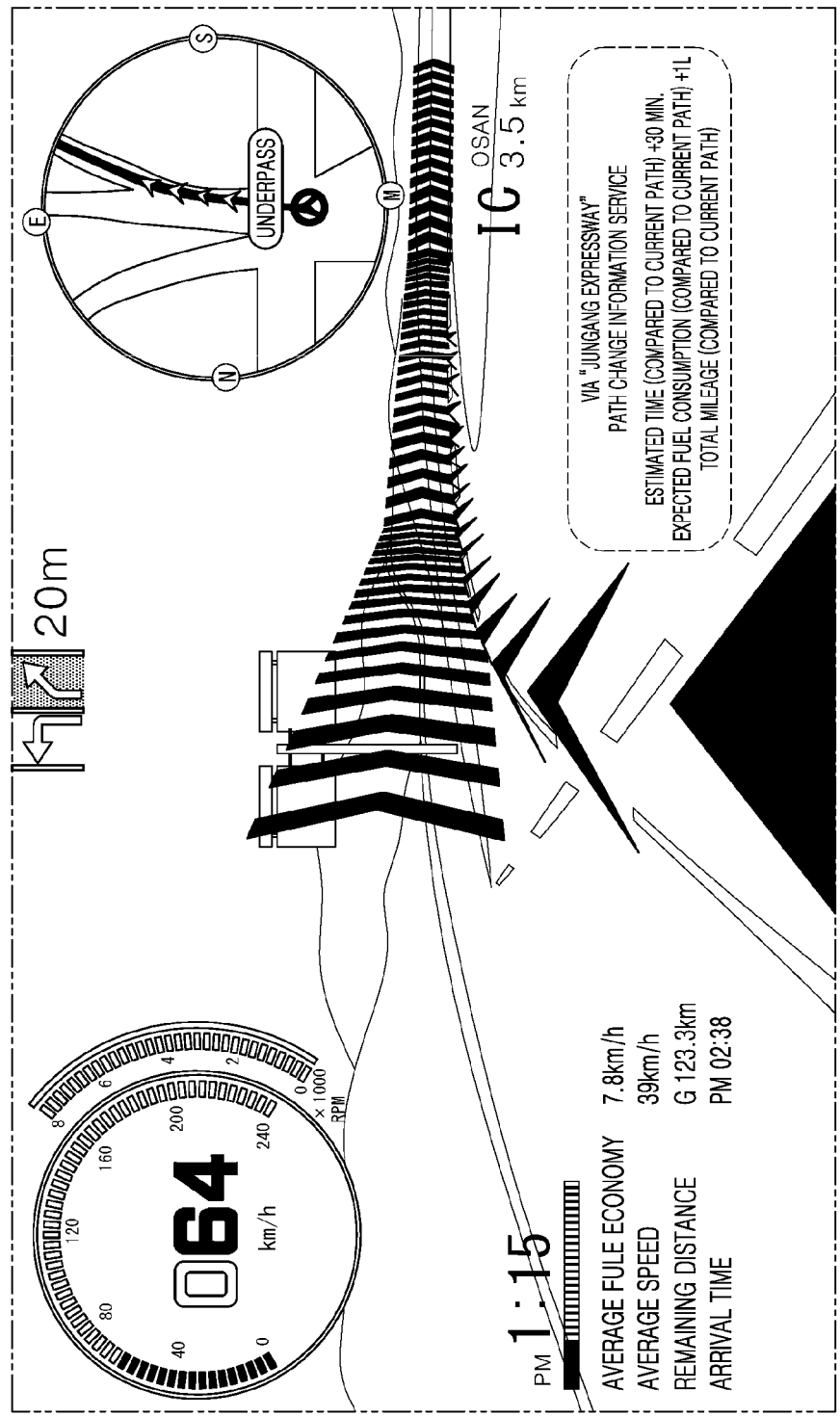
FIG. 11 is a diagram illustrating a path resetting information service method through an extended reality content including, for example, augmented reality of the map controller illustrated in FIG. 3.

FIG. 11 is a diagram illustrating a path resetting information service method through an extended reality content including, for example, augmented reality of the map controller illustrated in FIG. 3.

Referring to FIG. 11, the driving information detector 235 can transmit the information about a result of comparing the temporary path information with the previously preset path so as to be able to display it on the content display device 110 based on the extended reality. Thus, the content display device 110 can display the information about a result of comparing the temporary path information with the previously preset path using the content based on the extended reality of the augmented reality or the like.

Thus, the driver can check the information about the compared result through the content based on the extended reality, and can drive the vehicle after selecting the moving path according to an image displayed by the content based on the extended reality and the announcements.

If the driver maintains the existing path without changing the path information, the realization of the image content of the extended reality of the content display device 110 can be stopped and terminated.

The content display device 110 can guide the map information guided without a change in path through the screen of the existing navigation system. However, the content display device 110 can realize only path information changed by the temporary path information or the line of sight according to the preset option information as the image content of the extended reality, and can also set or change the resultant color as needed.

As described above, the navigation service assistance system according to the present disclosure is configured such that a place or a position extracted in real time on the basis of the line of sight of the driver can be immediately set as the intermediate point or the destination. Thus, the navigation service assistance system can assist in enabling the driver to set and change the intermediate point or the destination in a safe and easy way without performing the separate touch operation of the navigation system and the operation for voice recognition.

Further, the navigation service assistance system assists in enabling the driver to conveniently and rapidly check various pieces of information about a building or a place extracted in real time on the basis of the line of sight of the driver. Thus, the navigation service assistance system can provide convenience such that the driver can more easily find and set the desired intermediate point or destination information even if the driver does not previously know information such as an accurate name or address of the desired destination or intermediate point.

Further, the navigation service assistance system of the present disclosure assists in enabling the driver to check in real time the result of comparing the path preset in the navigation system or the like and the announcements based on the preset path, and with the path of the road at which the driver looks. Thus, the navigation service assistance system assists in enabling the driver to accurately check and drive only the preset path, and thereby can improve all of safety, satisfaction, and reliability of the driver.

While various embodiments have been described above, it will be understood to those skilled in the art that the embodiments described are by way of example only. Accordingly, the disclosure described herein should not be limited based on the described embodiments.

What is claimed is:

1. A navigation service assistance system comprising:
a sensor that checks a ride state of a driver of a vehicle and generates in real time line-of-sight information of the driver based on a direction at which the driver looks and a line of sight of the driver; and
a map controller that matches eyeball motion coordinates based on the line-of-sight information of the driver generated in real time and external image data to detect name or position information about at least one of a text, a place, a building, and a road at which the driver looks, and sets the detected text, place, building or road as a destination or an intermediate point according to selection of the driver,
wherein the map controller temporarily sets the detected name or position information about the text, the place, the building, or the road as the intermediate point or the destination to extract a path, and provides information about a result of comparing temporary path information and a previously preset path to be able to be displayed on a content display device, and assists in enabling the driver to check the information about a result of comparison and to reset the intermediate point or the destination.

2. The navigation service assistance system according to claim 1, wherein the sensor includes at least one of:
an internal camera that includes an image sensor for generating driver image data in the vehicle;
a sensor that generates a motion detection signal of the driver or an eyeball motion detection signal of the driver;
a motion detector that matches the driver image data and the motion detection signal of the driver or the eyeball motion detection signal of the driver to generate eyeball motion image information of the driver; and
a line-of-sight detector that generates the line-of-sight information of the driver in real time using the driver image data, the eyeball motion detection signal, and the eyeball motion image information of the driver.

3. The navigation service assistance system according to claim 1, wherein the map controller
sets and changes the position information of the text, the place, the building or the road, selected by a preset operation or voice recognition of the driver, as the intermediate point or the destination to reset a path.

4. The navigation service assistance system according to claim 3, wherein:
the map controller extracts content information including information about a preference, a postscript, a trade name, a type of business, a menu, and evaluation using the detected name or position information about the text, the place, the building, and the road, and transmits the extracted content information to be displayed on at least one content display device of a mobile communication device of the driver, an AVN system, a map display, an HUD, and a digital cluster display; and the content display device is a display device based on extended reality including at least one of virtual reality (VR), augmented reality (AR), and mixed reality (MR).

5. The navigation service assistance system according to claim 3, wherein the map controller includes:

an external camera that captures in real time an image of an external environment of the vehicle corresponding to a radius of a region at which the driver looks and generates external image data;

a line-of-sight coordinates generator that matches eyeball motion coordinates information extracted from the map controller and the external image data, and generates line-of-sight coordinates information corresponding to the line of sight of the driver on the basis of a size of the external image data and the eyeball motion coordinates;

a text recognition part that detects text information through a process of partitioning an image in an external image data partition region corresponding to the line-of-sight coordinates information; and a position information detector that detects a road, a building, a place or a place name in the external image data partition region corresponding to the line-of-sight coordinates information, and detects position information about the road, the building, the place or the place name, and position information about the road, the building, the place or the place name based on the text information.

6. The navigation service assistance system according to claim 5, wherein the map controller further includes:

a driving information detector that matches coordinates information based on GPS positions and the map data to detect driving information of the vehicle and preset path information in real time, sets the detected position information about the road, the building, or the place as a temporary intermediate point or a temporary destination, and generates temporary path information about the temporary intermediate point or the temporary destination;

an interface assistance part that checks whether or not selection of the driver exists, through a preset operation and voice recognition; and a path setting part that resets the detected position information about the road, the building, or the place according to the selected result from the interface assistance part as the intermediate point or the destination, generates path information about the reset intermediate point or destination, and shares position information about the reset intermediate point or destination with a content display device and a mobile communication device in real time.

7. The navigation service assistance system according to claim 6, wherein the map controller further includes:

a database that stores content information including information about a postscript, a trade name, a type of business, a menu, and evaluation related to the road, the building, the place, the trade name, or the place name that is preset, and shares the content information with the interface assistance part and the content display device; and a map data assistance part that provides map data to the driving information detector, the position information detector, and the path setting part.

8. The navigation service assistance system according to claim 7, wherein, when the position information about the road, the building, the place, or the place name is detected by the position information detector, the interface assistance part searches and collects the content information including information about a postscript, a trade name, a type of business, a menu, and evaluation related to the road, the building, the place, or the place name, using the detected position information, and shares the content information with the content display device and the mobile communication device of the driver in real time.

9. A vehicle navigation system comprising:

a navigation service assistance system that matches coordinates information based on a direction at which a driver looks and a line of sight of the driver and external image data, detects information about a text, a place, a building, and a road, and sets the detected text, place, building or road as a destination or an intermediate point according to selection of the driver; and a content display device that resets a path according to the destination or the intermediate point set or changed from the navigation service assistance system, and displays a path reset according to map data information.

10. The vehicle navigation system according to claim 9, further comprising a mobile communication device that resets the path according to the destination or the intermediate point set or changed from the navigation service assistance system, and displays the reset path according to the map data information.

11. The vehicle navigation system according to claim 9, wherein the navigation service assistance system includes:

a sensor that checks a ride state of the driver and generates in real time line-of-sight information of the driver based on a direction at which the driver looks and a line of sight of the driver; and a map controller that extracts eyeball motion coordinates information from the line-of-sight information of the driver and matches the eyeball motion coordinates information generated in real time and external image data to detect information about at least one of a text, a place, a building, and a road at which the driver looks, and sets the detected text, place, building or road as the destination or the intermediate point according to the selection of the driver.

12. The vehicle navigation system according to claim 11, wherein the sensor includes at least one of:

an internal camera that includes an image sensor for generating driver image data in a vehicle;

a sensor that generates a motion detection signal of a driver or an eyeball motion detection signal of the driver;

a motion detector that matches the driver image data and the motion detection signal of the driver or the eyeball motion detection signal of the driver to generate eyeball motion image information of the driver; and a line-of-sight detector that generates eyeball motion coordinates information of the driver in real time using the driver image data, the eyeball motion detection signal, and the eyeball motion image information of the driver.

13. The vehicle navigation system according to claim 11, wherein the map controller matches the eyeball motion coordinates information and the external image data to detect name or position information about at least one of the text, the place, the building, and the road at which the driver looks, and sets and changes the position information of the text, the place, the building or the road, selected by a preset operation or voice recognition of the driver, as the intermediate point or the destination to reset a path.

14. The vehicle navigation system according to claim 13, wherein:
the map controller extracts content information including information about a preference, a postscript, a trade name, a type of business, a menu, and evaluation that are related to at least one of the detected text, place, building, and road, and transmits the extracted content information to be displayed on at least one content display device of a mobile communication device of the driver, an AVN system, a map display, an HUD, and a digital cluster display; and
the content display device is a display device based on extended reality including at least one of virtual reality (VR), augmented reality (AR), and mixed reality (MIR).

15. The vehicle navigation system according to claim 13, wherein the map controller
temporarily sets the detected text, place, building, and road as the intermediate point or the destination to extract a path, and
assists in enabling information about a result of comparing temporary path information and a previously preset path to be displayed on a content display device, and enabling the driver to check the information about a result of comparison and to reset the intermediate point or the destination.

16. The vehicle navigation system according to claim 13, wherein the map controller
matches the eyeball motion coordinates information and the external image data to detect a road at which the driver looks during driving, and
detects a position of the road at which the driver looks during driving and information about the road in real time to compare the detected information with preset path information, and displays the compared result with a content display device to assist in enabling the driver to check in real time a result of comparing a path of a preset path and announcements based on the preset path, and with the road at which driver looks.

17. The vehicle navigation system according to claim 13, wherein the map controller includes:
an external camera that captures in real time an image of an external environment of the vehicle corresponding to a radius of a region at which the driver looks and generates external image data;
a line-of-sight coordinates generator that matches the eyeball motion coordinates information and the external image data, and generates line-of-sight coordinates information corresponding to a line of sight of the driver on the basis of a size of the external image data and eyeball motion coordinates;
a text recognition part that detects text information through a process of partitioning an image in an external image data partition region corresponding to the line-of-sight coordinates information; and
a position information detector that detects a road, a building, a place or a place name in the external image data partition region corresponding to the line-of-sight coordinates information, and detects position information about the road, the building, the place or the place name, and position information about the road, the building, the place or the place name based on the text information.

* * * * *